United States Patent
Neil

(10) Patent No.: US 6,667,836 B2
(45) Date of Patent: Dec. 23, 2003

(54) HIGH PERFORMANCE VIEWFINDER EYEPIECE WITH A LARGE DIOPTER FOCUS RANGE

(75) Inventor: Iain A. Neil, Calabasas, CA (US)

(73) Assignee: Panavision, Inc., Woodland Hills, CA (US)

( * ) Notice: Subject to any disclaimer, the term of this patent is extended or adjusted under 35 U.S.C. 154(b) by 222 days.

(21) Appl. No.: 09/838,059

(22) Filed: Apr. 19, 2001

(65) Prior Publication Data

US 2002/0191300 A1 Dec. 19, 2002

(51) Int. Cl.[7] ............................................. G02B 25/00
(52) U.S. Cl. .................... 359/643; 359/645; 396/373; 396/378
(58) Field of Search .............................. 359/643, 645; 396/373, 378, 386

(56) References Cited

U.S. PATENT DOCUMENTS

| | | | | |
|---|---|---|---|---|
| 4,217,048 A | * | 8/1980 | Egawa | 396/382 |
| 5,446,590 A | * | 8/1995 | Kikuchi | 359/645 |
| 5,749,008 A | * | 5/1998 | Ishihara et al. | 396/373 |
| 6,252,729 B1 | * | 6/2001 | Kanai | 359/834 |
| 2002/0191300 A1 | * | 12/2002 | Neil | 359/645 |

FOREIGN PATENT DOCUMENTS

JP      5-346608   * 12/1993   .................. 396/378

OTHER PUBLICATIONS

Literature from OpTex entitled "Electronic Extension Viewfinder For Sony ENG Cameras", dated Nov. 1990.

* cited by examiner

Primary Examiner—Huy Mai
(74) Attorney, Agent, or Firm—Morrison & Foerster LLP

(57) ABSTRACT

A viewfinder eyepiece for a camera having a video signal tap, particularly a professional high definition video camera, for viewing the display screen of a display device, such as a CRT, in the viewfinder. The eyepiece includes a negative powered lens on an optical axis and positioned adjacent the display screen, a first positive powered lens on the optical axis is spaced from the negative powered lens is located at an eye-viewing end of the eyepiece, and a second positive powered lens positioned on the optical axis between the negative powered lens and the first positive powered lens. The second positive lens is mounted in the eyepiece to be movable along the optical axis in the space between the negative powered lens and the first positive powered lens for adjusting the focus on the display screen through the eyepiece. The combined display device and eyepiece module is releasably connected to the rest of the viewfinder and extensions can be installed for modifying the view position without affecting the image viewing through the eyepiece.

31 Claims, 15 Drawing Sheets

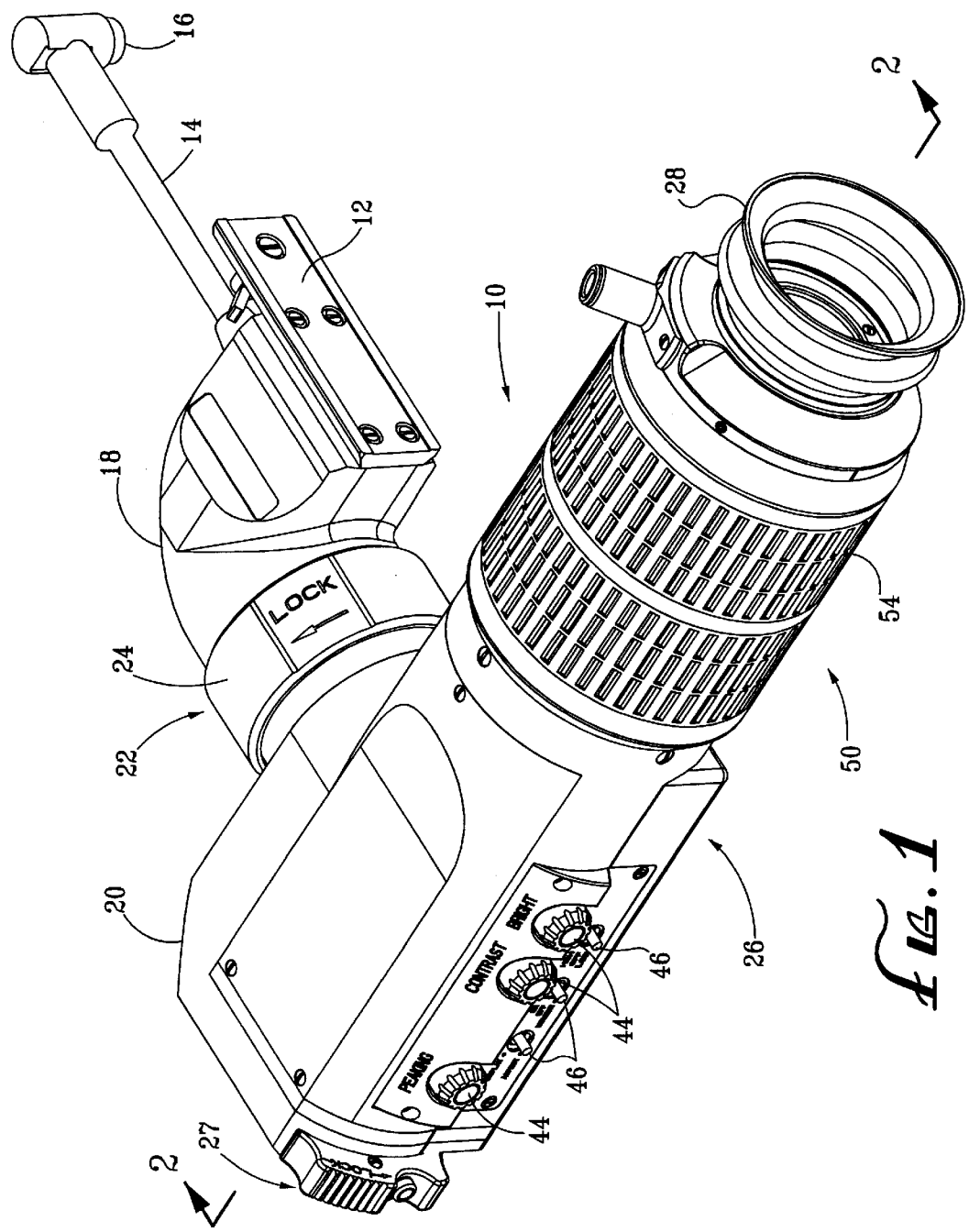

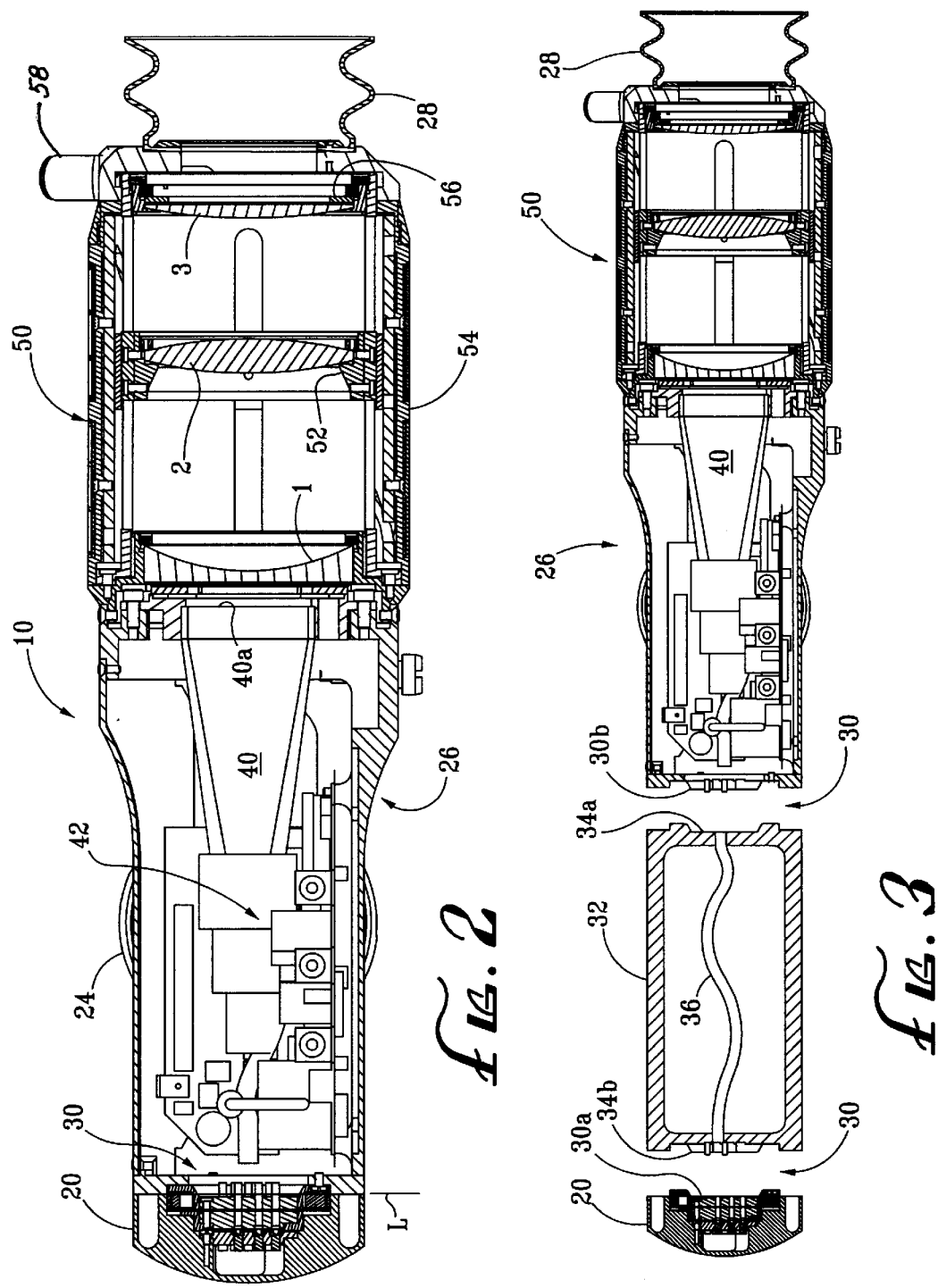

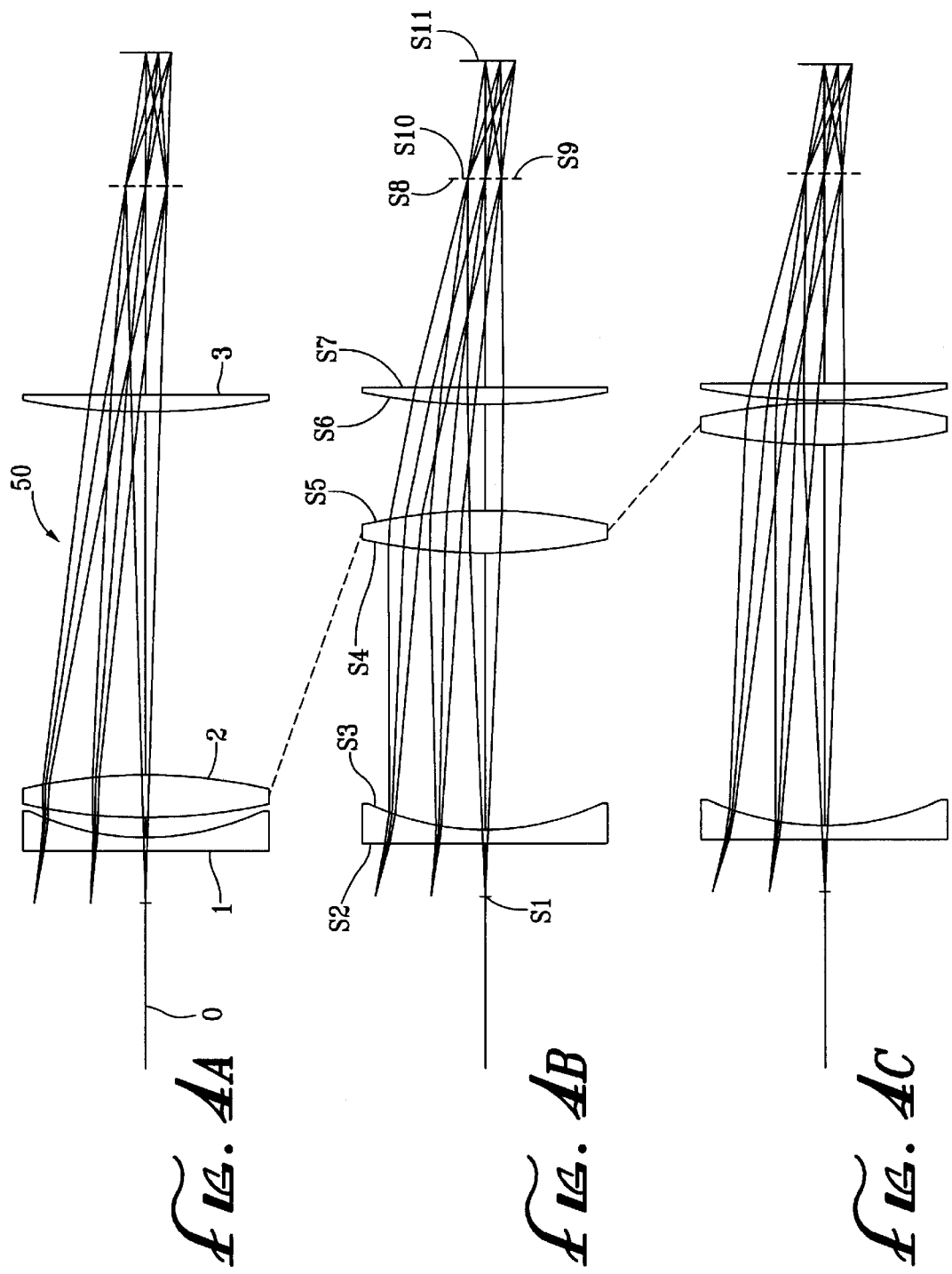

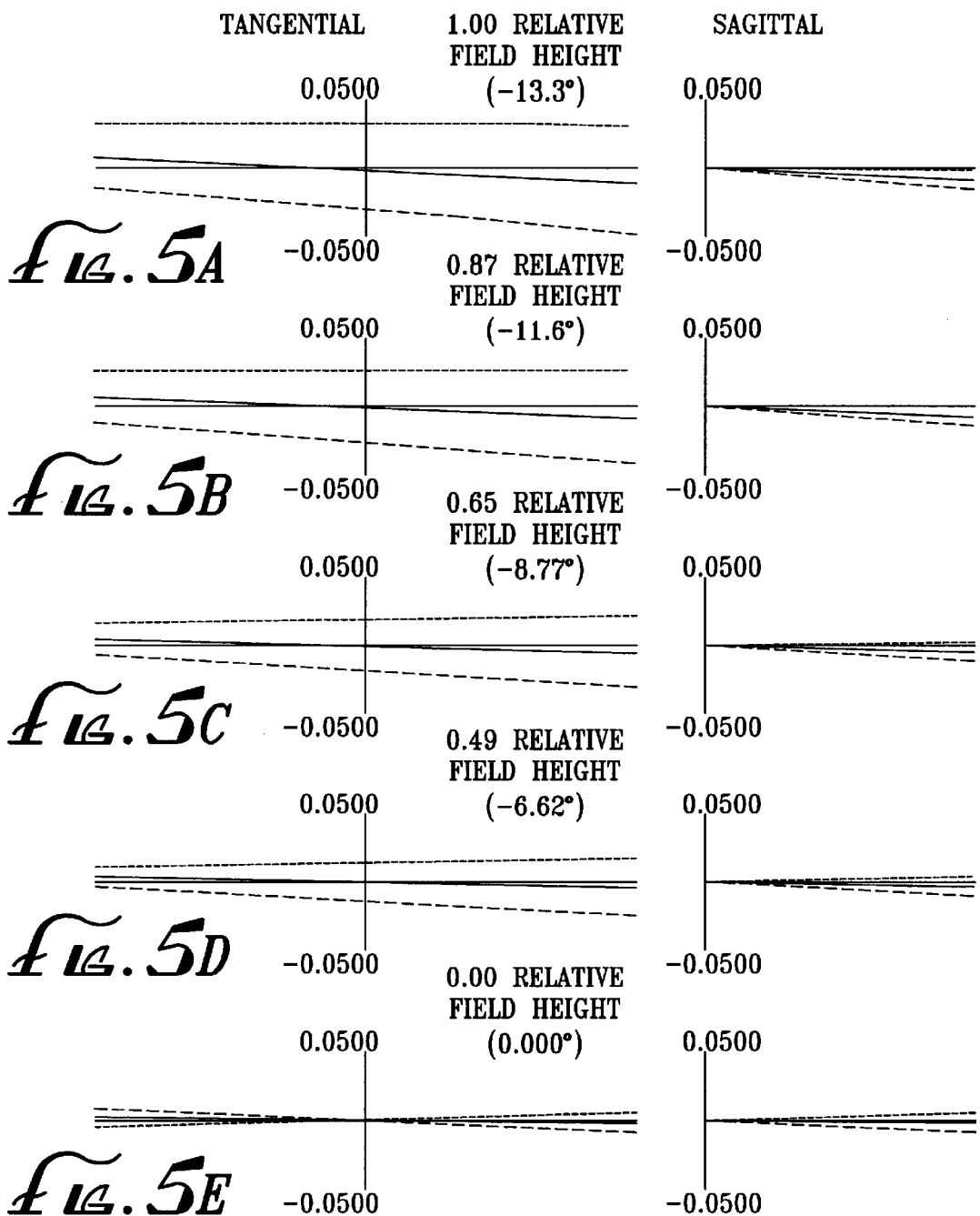

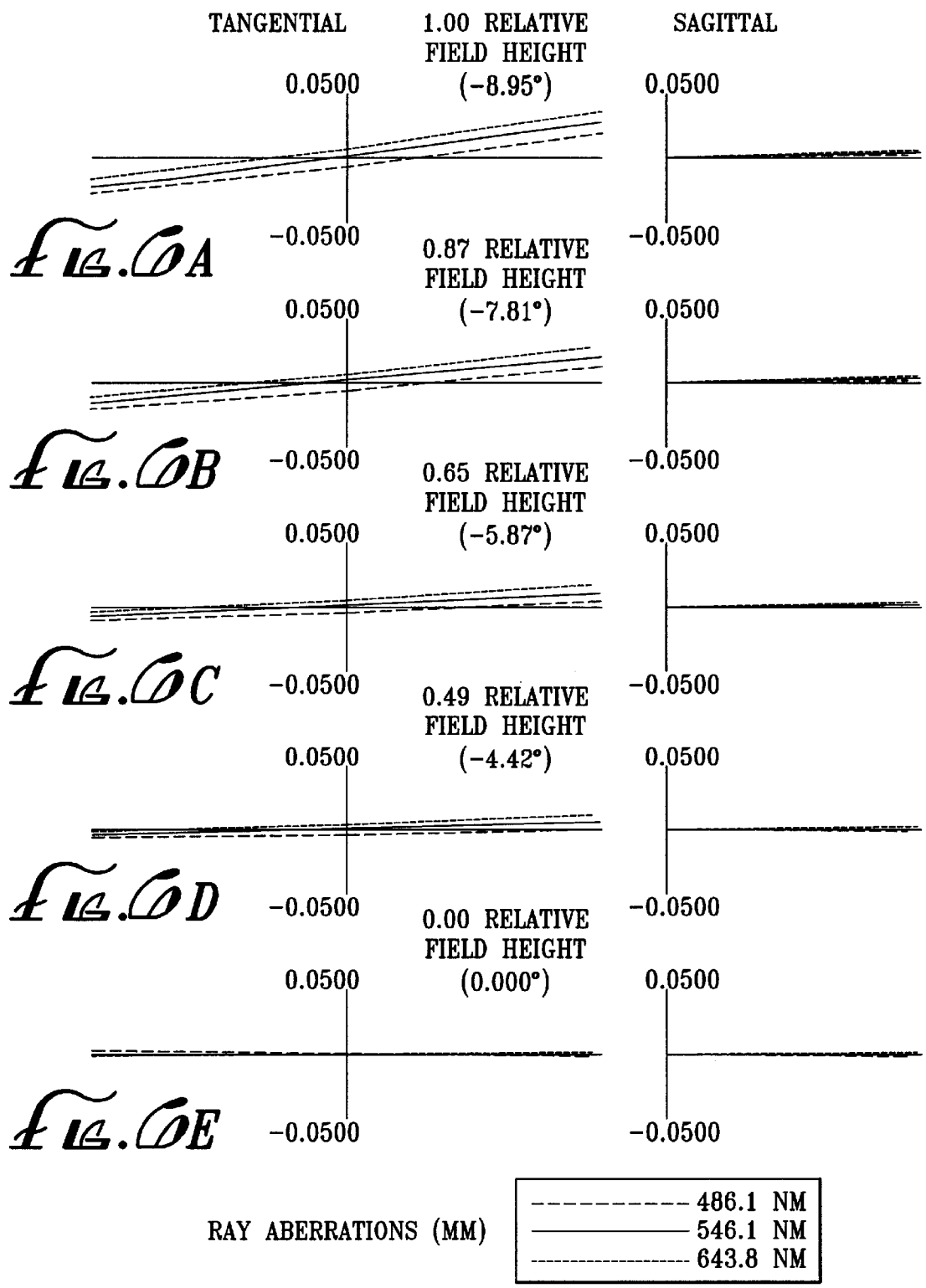

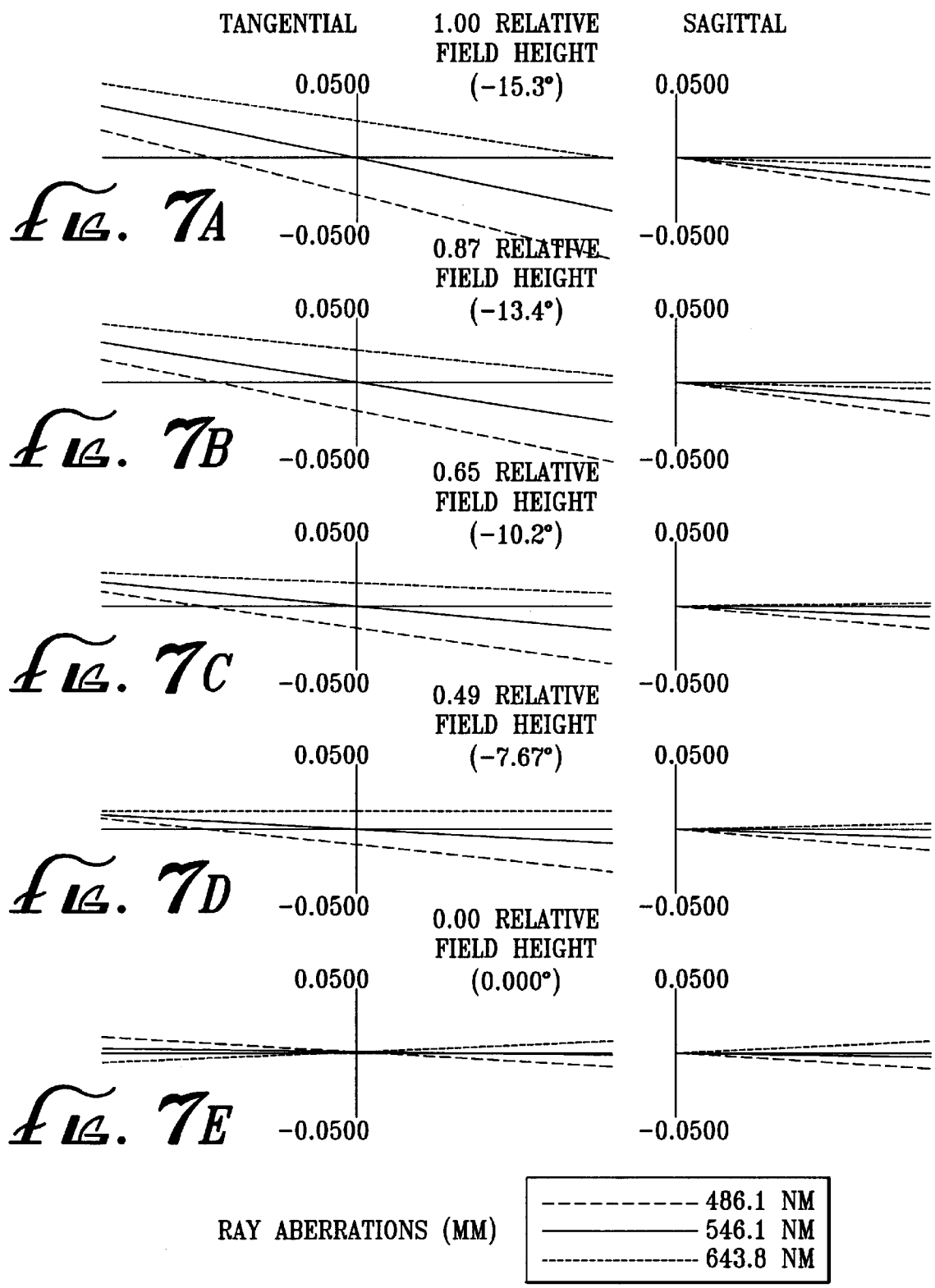

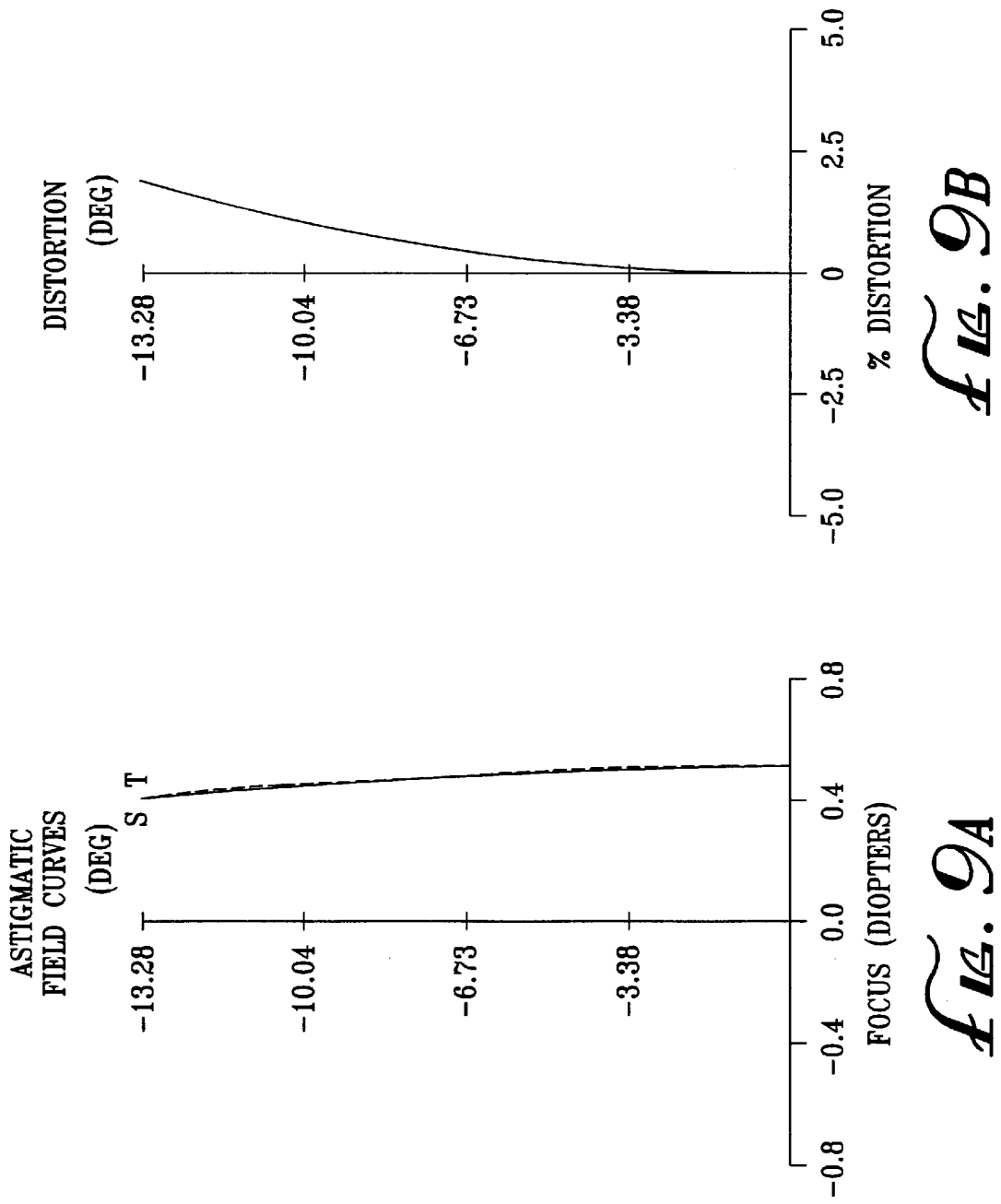

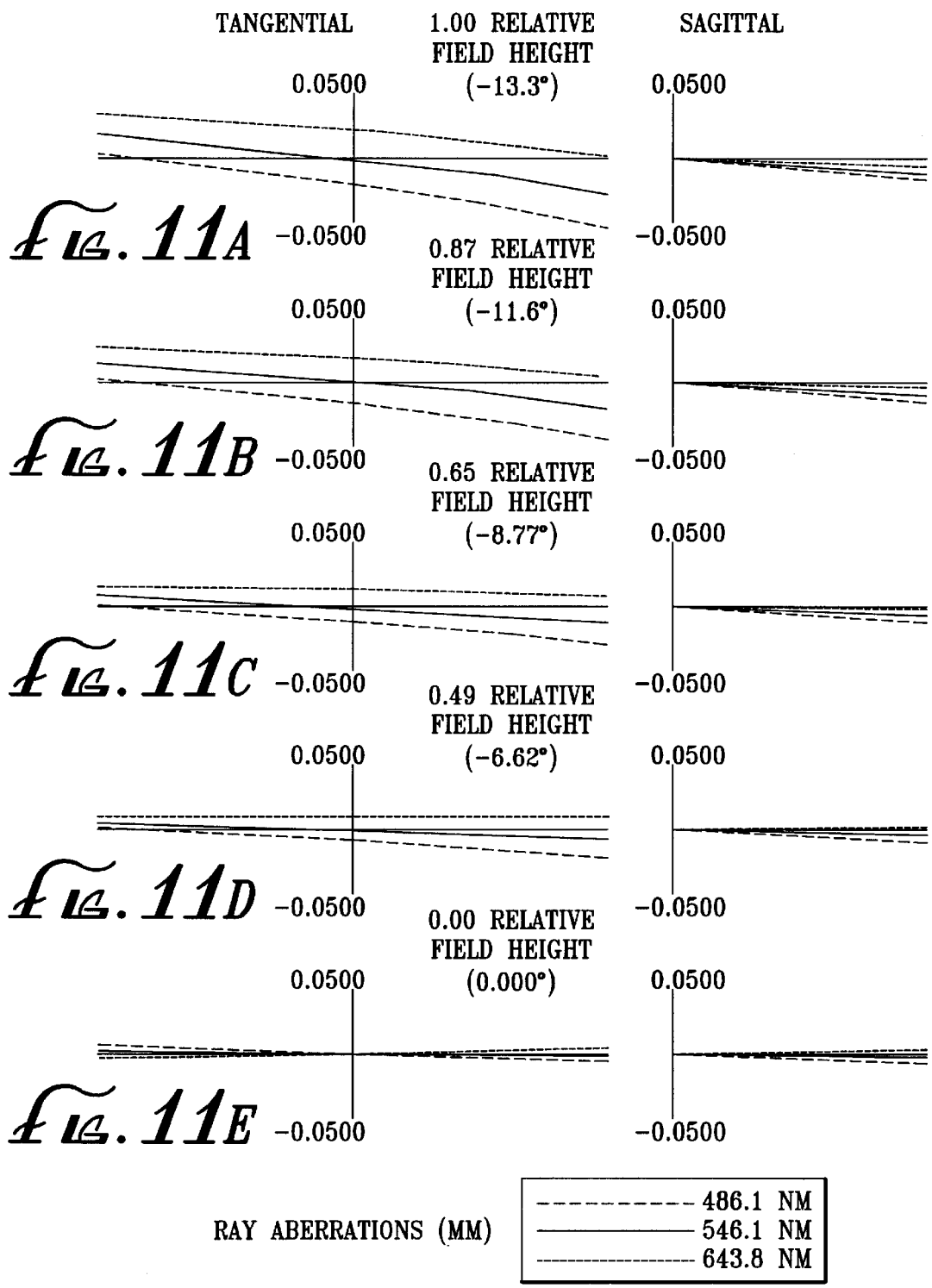

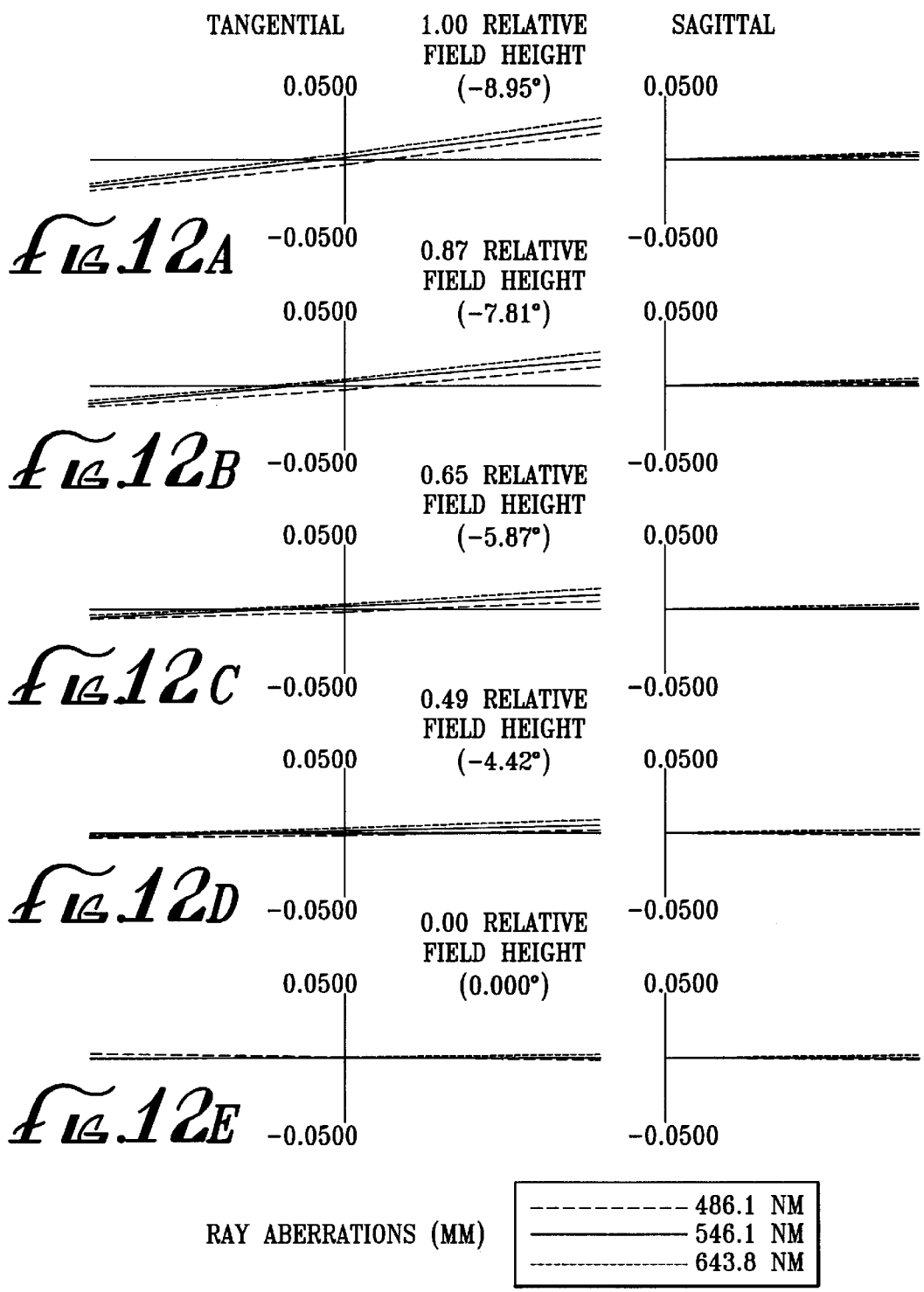

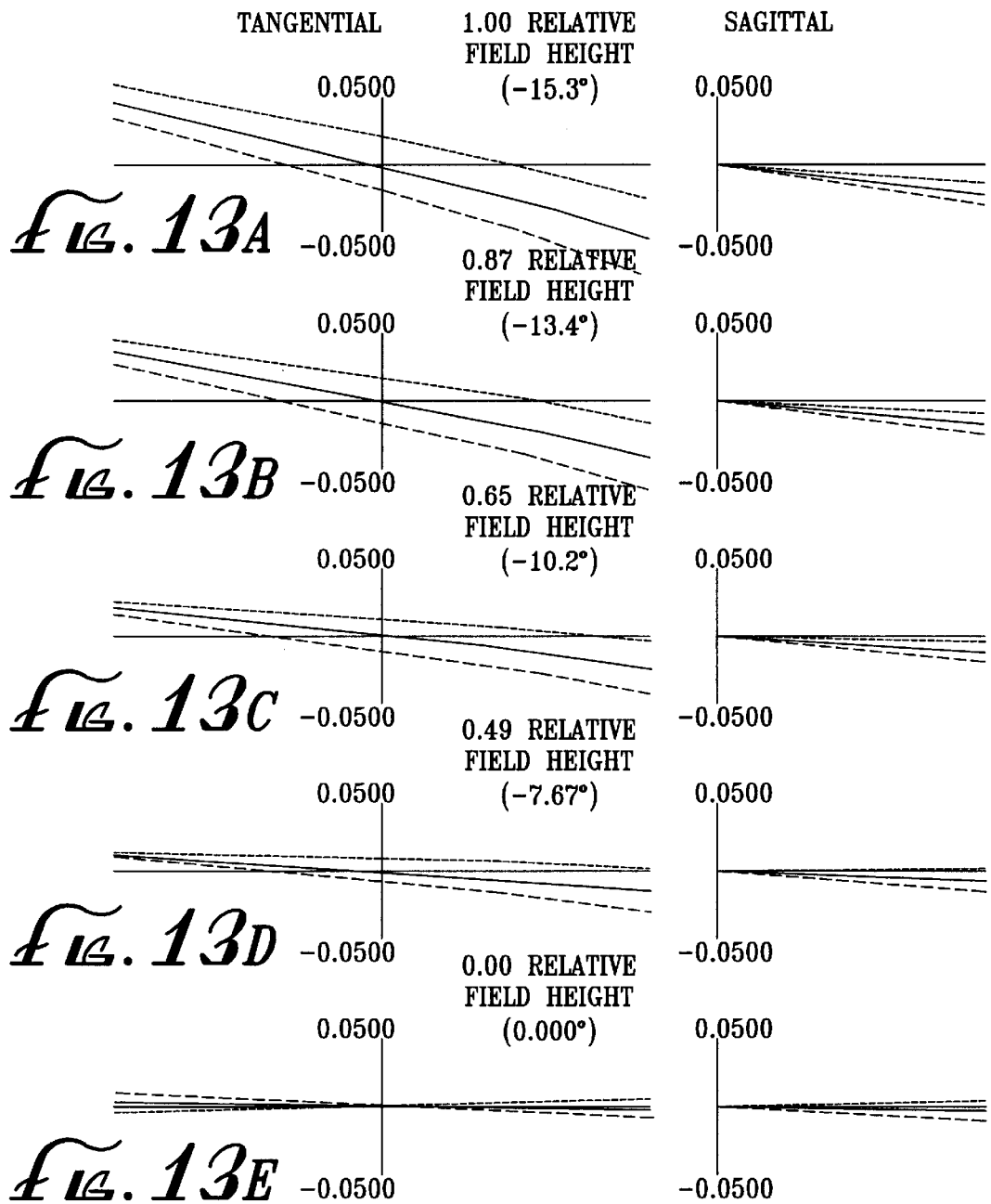

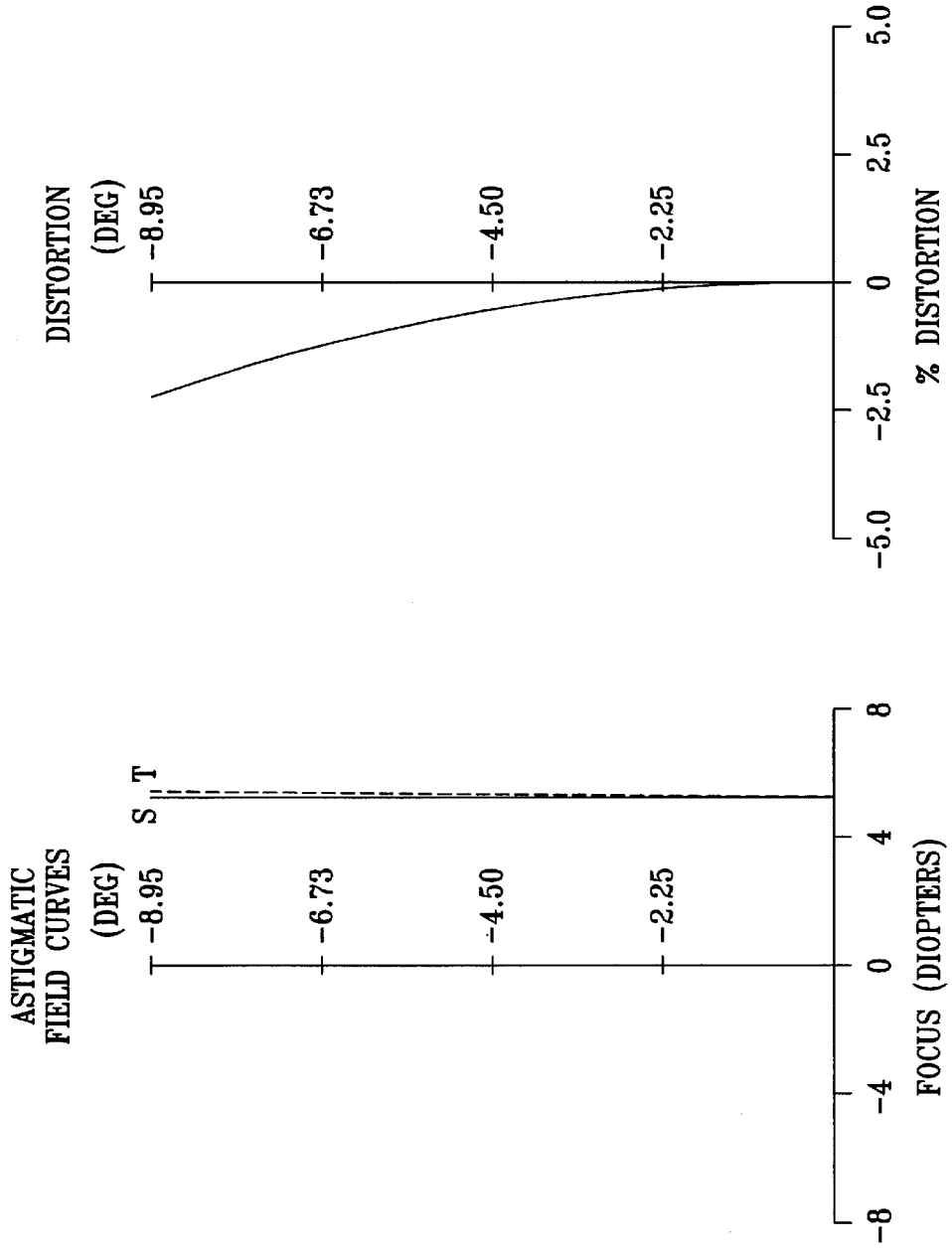

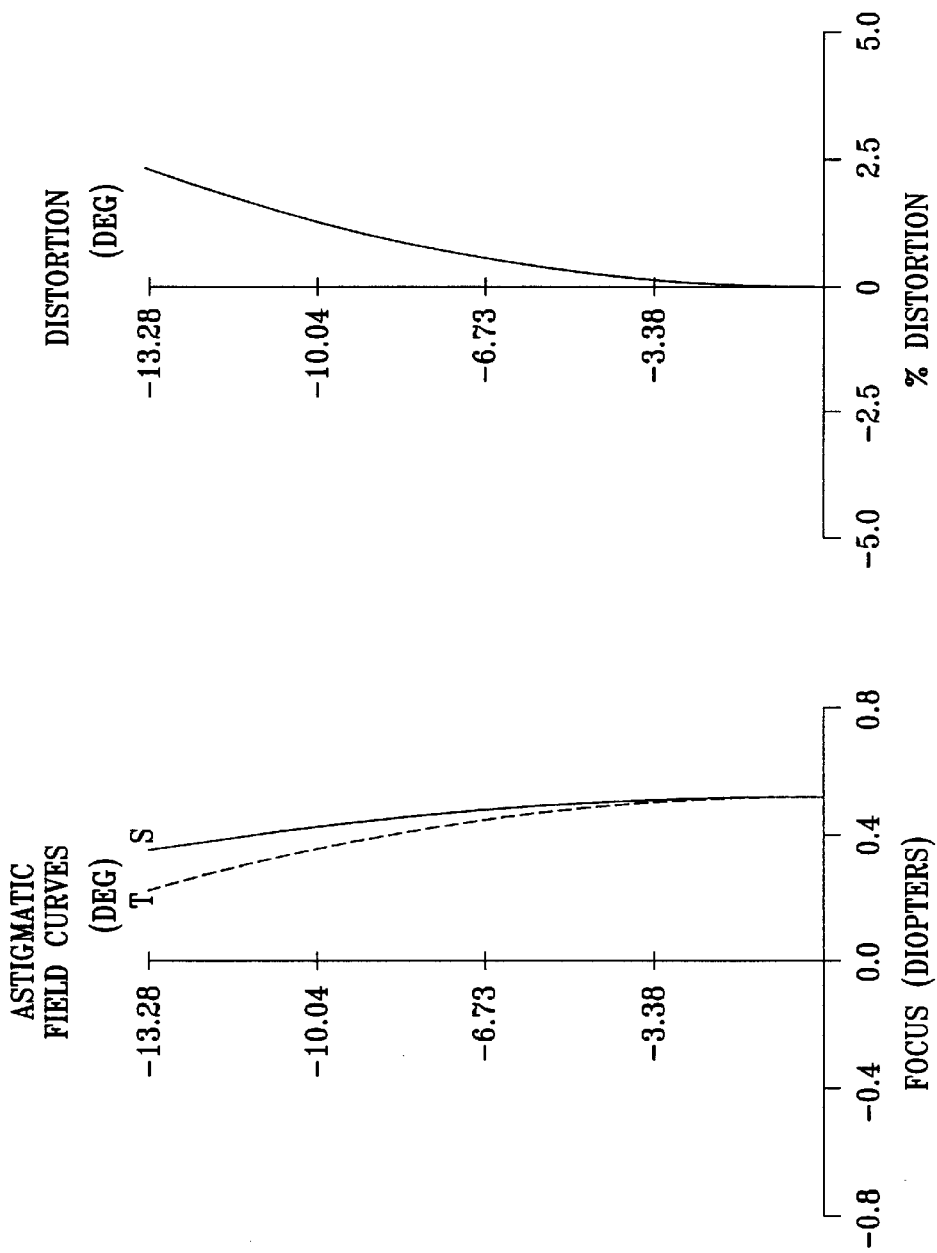

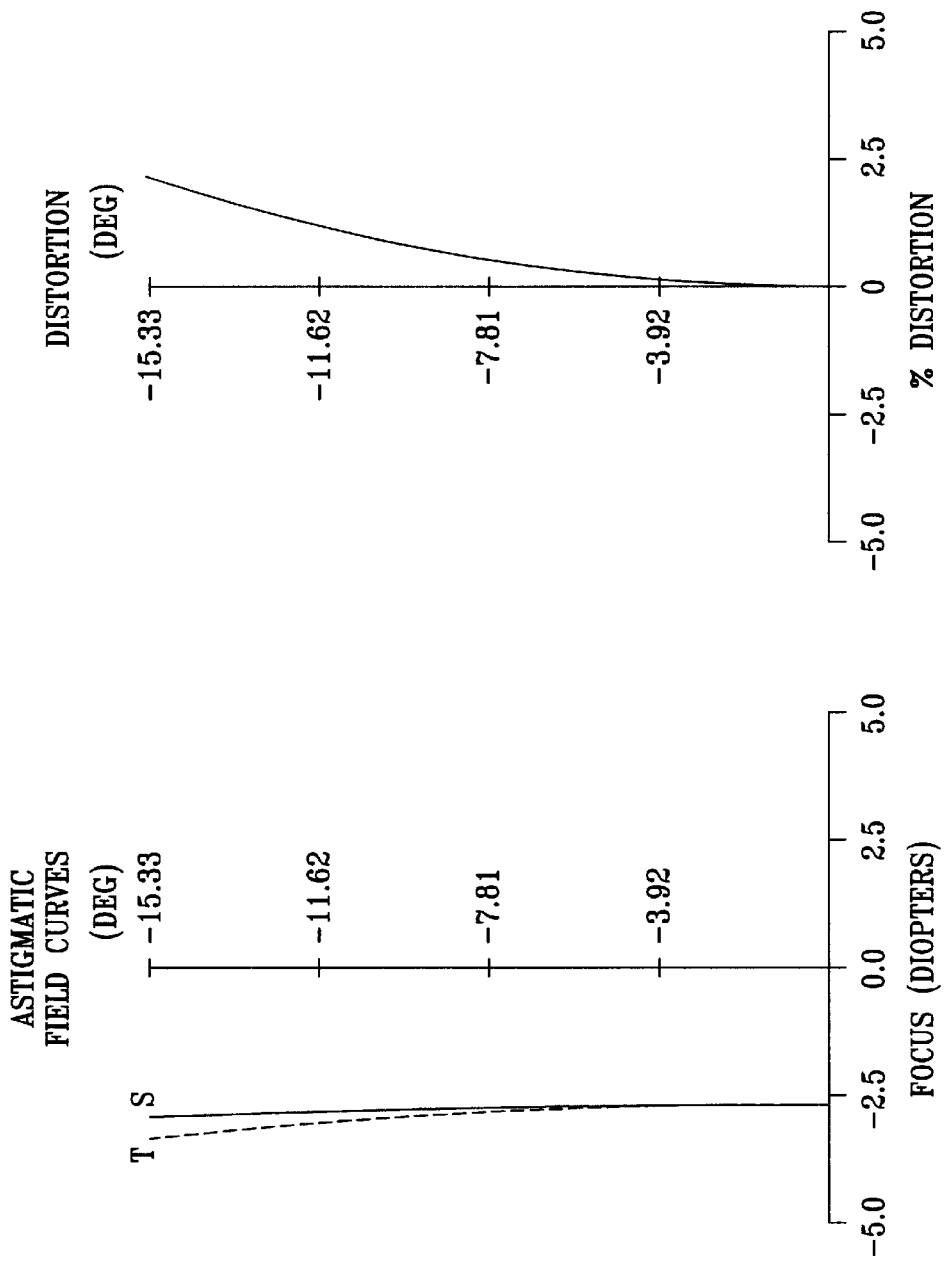

HIGH PERFORMANCE VIEWFINDER EYEPIECE WITH A LARGE DIOPTER FOCUS RANGE

The present invention relates to a viewfinder for camera having a video signal tap and, in particular, a viewfinder eyepiece for viewing a display device, such as a cathode ray tube (CRT), liquid crystal device (LCD), or the like, in the viewfinder of a camera, such as on a high definition (HD) video camera.

Professional video cameras for electronic news gathering (ENG), for electronic field production (EFP) and for studio use heretofore have used a relatively compact viewfinder that extends from the front of the camera to one side and then rearwardly for a short distance for convenient use by the cameraman when the HD video camera is supported on the cameraman's shoulder. The conventional viewfinder has a small CRT facing laterally which is viewed by the cameraman through an eyepiece and a mirror positioned at 45° to reflect the image displayed on the CRT. When the HD video camera is used on a tripod, a dolly, a crane or other camera support for an extended period of time, it becomes inconvenient to use the conventional viewfinder that extends for such a short distance that the cameraman must position his head adjacent the camera as though it was supported on his shoulder. Therefore the conventional viewfinder now is usually provided with an optical extension having additional optical elements to move the viewing position rearwardly to a more convenient location when the HD video camera is supported on a tripod or the like. However, since the CRT in the conventional viewfinder remains at the front of the camera facing laterally toward the mirror, the optical extension must include appropriate optical elements as an eyepiece for viewing the CRT at a greater distance than the eyepiece of the non-extended conventional viewfinder, and those optical elements must be different for each optical extension of a different length, thereby increasing the cost of a set of optical extensions of different lengths for accommodating the preferences of different cameramen. Moreover, the increased distance from the viewing position to the CRT when using optical extensions reduces the quality of the image viewed by the cameraman. Further, the conventional eyepiece has a limited diopter focus range, usually only from about zero (0) to plus three (+3) diopters, for accommodating the eyesight of the cameraman, which range is inadequate for nearsighted (myopic) and extremely farsighted (hypermyopic) persons.

Therefore, it is a principal object of the present invention to provide a novel viewfinder for a camera having a video tap that solves the aforementioned and other problems and shortcomings of the conventional video camera viewfinder. Specifically, it is an object of this invention to provide such a camera viewfinder in which a viewing module comprises a display device portion directly connected to an optical eyepiece, which module is repositioned as a unit, with or without a structural, non-optical extension for lengthening or shortening the viewfinder, whereby the display viewed by the cameraman remains optimal and the same. Another object of this invention is to provide a viewing module of a viewfinder for a camera having a video tap in which the viewing module includes an optical eyepiece with an adjustable focus over a large diopter focus range. Still another object is to provide such a viewing module in which the eyepiece is comprised of three powered lenses or lens groups on the optical axis in which only the middle lens or lens group is movable for adjusting the focus, whereby the length of the eyepiece does not change over the entire diopter focus range adjustment. A further object of this invention is to provide such a viewing module for the viewfinder of a camera having a video tap in which the three lenses or lens groups are comprised of a negative powered lens adjacent the image display device, such as a CRT or LCD, a positive powered lens in the middle and a positive powered lens adjacent the eye of the viewer. Another object of this invention is to provide a viewfinder eyepiece with a large eye relief distance for viewer comfort.

Other and more detailed objects and advantages of the present invention will appear to those skilled in the art from the following description of preferred embodiments of the invention in connection with the accompanying drawings wherein:

FIG. 1 is a perspective view of the camera viewfinder of the present invention separate from the camera having a video tap on which this viewfinder would be mounted;

FIG. 2 is a sectional elevation view of the viewing module and mounting base of the viewfinder of the present invention taken substantially on the line 2—2 shown in FIG. 1;

FIG. 3 is an exploded sectional elevation view of the viewing module and mounting base shown in FIG. 2 separated an adequate distance for positioning an extension therebetween;

FIGS. 4A, 4B and 4C are optical diagrams of a preferred embodiment of the optical eyepiece portion of the viewfinder of the present invention in three different positions of the focus adjustment;

FIGS. 5A–5E, 6A–6E and 7A–7E are ray aberration graphs illustrating the performance of the viewfinder eyepiece optical system of a preferred embodiment of this invention in the three positions of focus adjustment shown in FIGS. 4A, 4B and 4C, respectively;

FIGS. 9A and 9B are graphs of the astigmatism and distortion characteristics, respectively, for the viewfinder eyepiece optical system of a preferred embodiment of this invention in the focus adjustment position shown in FIG. 4B;

FIGS. 11A–11E, 12A–12E and 13A–13E are ray aberration graphs illustrating the performance of an alternate embodiment of the viewfinder eyepiece optical system of this invention in the three focus adjustment positions shown in FIGS. 4A, 4B and 4C;

FIGS. 14A and 14B are graphs of the astigmatism and distortion characteristics, respectively, for the alternate embodiment of the viewfinder eyepiece optical system of this invention in the adjustment position shown in FIG. 4A;

Figures 8A, 8B:
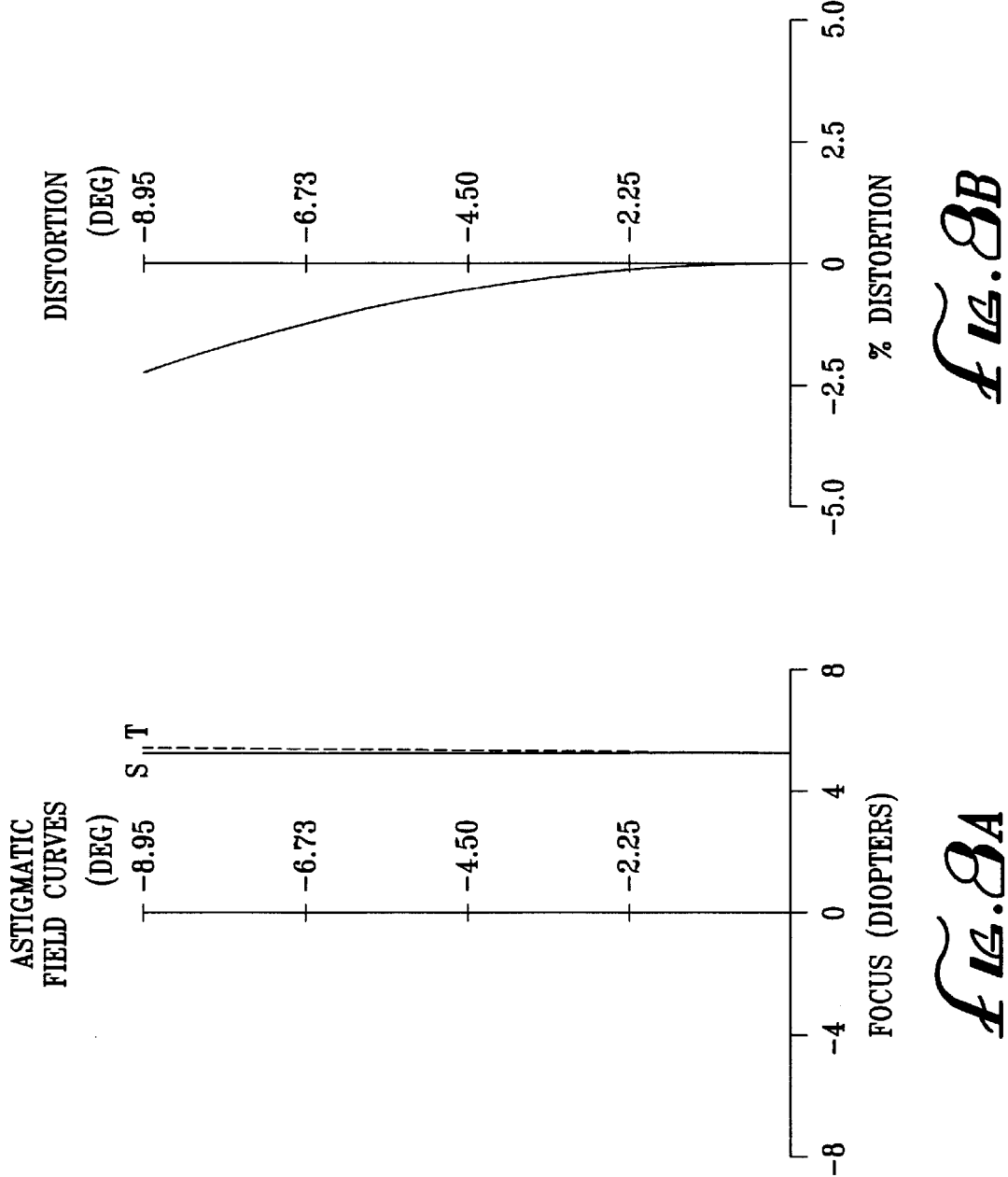
FIGS. 8A and 8B are graphs of the astigmatism and distortion characteristics, respectively, for the viewfinder eyepiece optical system of the preferred embodiment of this invention in the focus adjustment position shown in FIG. 4A.

FIGS. 15A and 15B are graphs of the astigmatism and distortion characteristics, respectively, for the alternate embodiment of the viewfinder eyepiece optical system of this invention in the adjustment position shown in FIG. 4B; and FIGS. 16A and 16B are graphs of the astigmatism and distortion characteristics, respectively, for the alternate embodiment of the viewfinder eyepiece optical system of this invention in the adjustment position shown in FIG. 4C.

Referring now to FIG. 1, a viewfinder assembly, generally designated 10, incorporating the present invention is illustrated in a construction that is particularly suited for mounting on a conventional HD video camera (not shown), such as a Sony HDWF900 model, but it will be readily understood by those skilled in the art that the present invention is equally applicable to other types and models of professional video cameras and to professional film cameras that include a video signal tap that may use the viewfinder of the present invention. The viewfinder assembly 10 includes a dovetail member 12 for slidably mounting on a matching dovetail (not shown) on the top, front portion of the camera, whereby the viewfinder assembly 10 extends laterally and then rearwardly along the side of the camera in a conventional manner. The viewfinder assembly 10 includes a video signal cable 14 with a plug 16 for connecting to the video tap socket (not shown) of the video or film camera in a conventional manner. The viewfinder 10 has an elbow or knuckle 18 on which the dovetail 12 is mounted and the knuckle 18 extends forwardly and then laterally to a pivotal connection with a pivot member 20 of the viewfinder assembly 10, which allows the pivot member 20 to pivot about a laterally extending axis relative to the knuckle 18. A pivot lock mechanism 22 is provided between the knuckle 18 and pivot member 20 for selectively locking the pivot member 20 relative to the knuckle 18 in any desired position by rotating the outer ring 24 of the pivot lock mechanism 22.

A viewing module, generally designated 26, is removably attached by a bayonet-type lock mechanism 27 to the pivot member 20 and, as shown, extends rearwardly a short distance to position the eye cup 28 appropriately for use by a cameraman supporting the camera on his shoulder in the conventional manner. At this point it should be noted that when the camera is mounted on a tripod or the like, rather than being carried on the shoulder of the cameraman, the eye cup 28 of the conventional viewfinder is in an awkward position immediately adjacent the side of the camera and therefore it has become common practice to add optical extensions of an appropriate length to the base of the viewfinder to move the viewing location to the rear of the camera for convenience. Since the CRT remains in the base of the conventional viewfinder and is oriented laterally, essentially at the location of knuckle 18, the optical extension creates a substantial distance between the eye cup and the CRT whereby the viewable image deteriorates.

Referring to FIG. 2, which is a sectional elevation view of a portion of the viewfinder assembly 10, the connection between the pivot member 20 and the viewing module 26 at the parting line L is generally shown and will be described briefly, although the details thereof are not an inventive aspect of the present invention. The viewing module 26 slidably engages the pivot member 20 in an axial direction and is locked thereto, without rotation therebetween, by the bayonet-type lock mechanism 27, although any equivalent mounting may be used. The pivot member 20 and viewing module 26 have a mating electrical contact assembly 30 by which the video signals, electrical power and the like are supplied to the viewing module 26 from the pivot member 20, which receives those video signals, electrical power and the like through wires (not shown) from the cable 14 through the knuckle 18 to the pivot member 20. The viewing module 26 is provided with a cathode ray tube (CRT) 40, although any display device may be used, that faces rearwardly within the tubular viewing module 26, which also includes all of the conventional operating and control components 42 for the display device CRT 40. Control knobs 44 and control buttons 46 (see FIG. 1) are provided on the side of the viewing module 26 for controlling such features of the CRT 40 as peaking, contrast, brightness, display aspect, on and off, and the like. The knobs 44 and buttons 46 are in a convenient location to both see and reach, and their location does not change relative to the cameraman's face when positioned against the eye cup 28, such as when an extension member is added as described below, in contrast to the inconvenient and variable distance location of the same controls on the front of a conventional viewfinder.

Before describing the eyepiece portion of the viewing module 26, the manner in which an extension may be used with the present invention will be described by reference to FIG. 3. A tubular extension 32 may be interposed between the pivot member 20 and the viewing module 26 by disconnecting those two components at the parting line L by releasing the bayonet-type lock mechanism 27. The mating electrical contact assembly 30 mentioned above includes a socket 30a on the pivot member 20 and a plug 30b on the viewing module 26 that are operatively connected when assembled as shown in FIG. 2. The extension 32 includes an electrical contact plug 34b on the front that is identical to plug 30b on the front of viewing module 26 for connecting to the socket 30a on the pivot member 20. Similarly, the rear end of extension 32 includes an electrical socket 34a identical to the socket 30a on pivot member 20 for receiving the plug 30b on the front end of viewing member 26 when the viewing member is connected to the extension 32. The plug 34b is connected to the socket 34a by a cable 36 that extends through the hollow center of the extension 32 for conducting the video signals, electrical power and the like from one end to the other of the extension 32. Similarly, bayonet-type lock mechanisms are provided on the front end and the rear end of extension 32 that match the bayonet-type lock mechanism 27 that joins and locks the viewing module 26 to the pivot member 20 as shown in FIG. 1. Thus, when an extension 32 is mounted between the pivot member 20 and the viewing module 26 a rigid viewfinder structure is created and all of the video signals, electrical power and the like are transmitted through the extension 32 in the same manner as the though the extension were not present. The extension 32 may be of any desired length or may be adjustable in length by, for example, providing two or more hollow telescoping members and a cable 36 of adequate length to accommodate the full range of telescopic adjustment. Moreover, as will appear more fully below, the omission of an extension 32 (FIGS. 1 and 2) or the inclusion of an extension 32 (FIG. 3) does not change the viewing characteristics provided to the cameraman by the viewing module 26 since there is no change in the viewing system when the viewing module is moved. In fact, the viewing module 26 even may be used in a hand-held mode by merely providing a cable with a socket, similar to sockets 30a, 34b, to connect to the plug 30b on the front of the viewing module 26 and then connecting the cable either directly to the camera video tap (not shown), like plug 16 of cable 14, or to socket 30a of the pivot member 20.

Referring again to FIG. 2, the viewing module 26 is provided with a viewfinder eyepiece, generally designated 50, extending rearwardly from the CRT 40 to the eye cup 28. The eyepiece 50 includes three lenses that are illustrated as singlets and will be so described as preferred embodiments, but it will readily appear to those skilled in the art that one or more of the singlets may be formed by two or more lens elements without departing from the present invention. A first lens 1 of a negative power is mounted adjacent the image display surface or screen 40a of the CRT 40 in a fixed position and distance from screen 40a. A second lens 2 of a positive power is mounted in the middle of the viewfinder eyepiece 50 and is adjustably movable in the axial direction along the optical axis between the first lens 1 and a third lens 3 that is mounted at the rear of the viewfinder eyepiece 50. The lens support carriage 52 that supports lens 2 is slidably mounted in the viewfinder eyepiece 50 to move longitudinally upon rotation of an outer sleeve 54 in any convenient manner such as by using a conventional helical slot and pin arrangement. Preferably, the third lens 3 is provided with a heating element 56, supplied with electrical power through a connector 58, for demisting the third lens element 3 in a conventional manner and the third lens 3 is relatively thin for enhancing the demisting feature. The longitudinal movement of the second lens 2 in the viewfinder eyepiece 50 accomplishes the focus adjustment for allowing the cameraman to focus on the screen 40a of the CRT 40 to accommodate the short or long sightedness (myopia and hypermetropia, respectively) of the cameraman without changing the length of the viewing module 26 or the viewfinder eyepiece 50 and without changing the distance from the eye cup 28 to the screen 40a of the CRT 40. It should be noted that while the preferred embodiment of this invention has been described as using a cathode ray tube 40, it will readily appear to those skilled in the art that any display device that is capable of displaying the image at the location of screen 40a that is being viewed by the camera may be used with the present invention as an equivalent of the CRT 40, and therefore all such display devices shall be referred to herein as a CRT.

Referring now to FIGS. 4A, 4B and 4C, which are optical diagrams of a preferred embodiment of the viewfinder eyepiece 50 lens system, the movable second lens 2 is shown in three different positions, namely, an extreme left position, a median position, and an extreme right position, but it will be readily understood by those skilled in the art that the second lens 2 may be selectively positioned anywhere between the two extreme positions. Specifically, FIG. 4A illustrates the position of second lens 2 for an extremely nearsighted person that provides a correction of about plus five (+5.0) diopters for accommodating a person with about minus five (−5.0) diopters vision. FIG. 4B illustrates the position of second lens 2 for a correction of about plus one half (+0.5) diopters for a person having about minus one half (−0.5) diopters vision, which is generally considered normal vision. FIG. 4C shows the position of second lens 2 for providing a correction of about minus three (−3.0) diopters for a farsighted person having about a plus three (+3.0) diopters vision. As described above, the positions of the first lens 1 and third lens 3 do not change, as is observable by comparing FIGS. 4A. 4B, and 4C, when the second lens is moved. Although the general configuration of each lens element 1, 2 and 3 is depicted in the Figures, the actual radius of each lens surface is set forth below in Tables 1 and 2, which will be described later. The lens surfaces and significant locations and planes along the optical axis O are identified by the letter "S" followed by a numeral from S1 through S11 and these lens surfaces, locations, and planes are identified by the same numerals S1–S11 in Tables 1 and 2 set forth below. The location S1 is the Object Plane of the optical system and coincides with the location of the screen 40a of the CRT 40 on which the eyepiece is focusing. The six surfaces of the three lenses 1, 2 and 3 are numbered from left to right as surfaces S2–S7, as shown in FIG. 4B. The optical stop S8, eye pupil position S9 and the perfect eye lens S10 of this optical system are all at the same location along the optical axis. The flat image surface S11 on the optical axis O is equivalent to the location of the retina of the human eye of the person using the viewfinder optical system 50.

Tables 1 and 2 that are set forth below provide the optical design specifications for the preferred embodiment and an alternate embodiment, respectively, of the viewfinder eyepiece optical system of the present invention. Specifically, Table 1 is an optical design that is well suited for viewing a monochromatic image display, such as a black and white CRT, and Table 2 is an optical design that is well suited for both a monochromatic and a polychromatic image display such as a three-color CRT. The only difference in the optical design systems of Tables 1 and 2 is in the second lens 2 which is of a different glass and has a different radius of curvature on surfaces S4 and S5 for the two designs. In both Tables, the first column entitled "Item" lists the lens element by the same numerals (1, 2 and 3) and the significant locations along the optical axis by a descriptive label such as "Object Plane", "Stop" and the like. The second column of each Table labeled "Surface" is a list of the surface numbers identified in FIGS. 4A–4C and significant locations that do not comprise a surface. The next column entitled "Focus Position" lists the location of the "Surface" identified in the preceding column for each of the three focus positions shown in FIGS. 4A, 4B and 4C as Focus Positions "A", "B" and "C", respectively. The Focus Position "All" signifies that the spacing or separation of that surface from the next adjacent surface to the right does not change, i.e. the "Separation" remains the same for "All" focus positions of the second lens 2. In accordance with the normal practice in lens design, the "Separation" listed in the next column is measured from the surface listed on that line of the Table to the next surface listed, which is to the right as viewed in FIGS. 4A–4C. For example, the separation from S4 to S5 is 8.20 mm, which is the thickness of second lens 2 measured on the optical axis O, and that thickness obviously remains the same for "All" positions of the second lens 2. On the other hand, the Separation between the right hand surface S5 of lens 2 to the left hand surface S6 of lens 3 is 69.85 mm in Focus Position A (FIG. 4A), 20.40 mm in Focus Position B (FIG. 4B) and 0.50 mm in Focus Position C (FIG. 4C) because of the change in position of the lens 2. The next column in each Table provides the "Radius of Curvature" of that surface of the lens or plane. The next three columns in each Table identifies the "Material" of that element by type, code and material name, and when the "Material" from one surface to the next surface is an air space, it is identified as "Air". The last column in each Table sets forth the maximum aperture diameter of the light rays at each Surface. Set forth below in Table 1 are the design specifications for the preferred embodiment of the viewfinder eyepiece optical system of the present invention, which system is particularly suitable for monochromatic image viewing.

TABLE 1

| Item | Surface | Focus Position | Separation (mm) | Radius of curvature (mm) | Material Type | Material Code | Material Name* | Maximum Aperture Diameter** (mm) |
|---|---|---|---|---|---|---|---|---|
| Object Plane | S1 | ALL | 10.00 | Flat | Air | | | 42.50 |
| 1 | S2 | ALL | 2.60 | Flat | Glass | 522598 | S-NSL5 | 39.92 |
|  | S3 | A | 3.75 | 52.464 | Air | | | 38.85 |
|  |  | B | 53.20 | | | | | |
|  |  | C | 73.10 | | | | | |
| 2 | S4 | ALL | 8.20 | 103.498 | Glass | 522598 | S-NSL5 | 39.15 |
|  | S5 | A | 69.85 | −103.498 | Air | | | 39.03 |
|  |  | B | 20.40 | | | | | |
|  |  | C | 0.50 | | | | | |
| 3 | S6 | ALL | 3.16 | 131.160 | Glass | 522598 | S-NSL5 | 28.67 |
|  | S7 | ALL | 40.00 | Flat | Air | | | 27.87 |
| Stop | S8 | ALL | 0.0 | Flat | Air | | | 7.00 |
| Eye Pupil Position | S9 | ALL | 0.0 | — | — | — | — | — |
| Perfect Eye Lens*** | S10 | ALL | 22.50 | — | — | — | — | — |
| Image Plane**** | S11 | ALL | — | Flat | — | — | — | — |

NOTES:
*All material name designations are for Ohara glasses.
**Maximum aperture diameter at object plane, surface S1 is equal to object diameter.
***Surface S10 emulates a perfect eye lens of focal length 22.5 mm which produces no residual optical aberrations including field curvature, hence an image plane that is flat.
****Image plane is flat and equivalent to the retina of a human eye.

Set forth below in Table 2 are the optical design specifications for the alternate embodiment of the viewfinder eyepiece optical system of the present invention, which is particularly suited for polychromatic image viewing, although it is more expensive than the optical system of Table 1 because of the substantially greater cost of the glass of the second lens 2.

TABLE 2

| Item | Surface | Focus Position | Separation (mm) | Radius of curvature (mm) | Material Type | Material Code | Material Name* | Maximum Aperture Diameter** (mm) |
|---|---|---|---|---|---|---|---|---|
| Object Plane | S1 | ALL | 10.00 | Flat | Air | | | 42.50 |
| 1 | S2 | ALL | 2.60 | Flat | Glass | 522598 | S-NSL5 | 39.95 |
|  | S3 | A | 3.75 | 52.464 | Air | | | 38.89 |
|  |  | B | 53.20 | | | | | |
|  |  | C | 73.10 | | | | | |
| 2 | S4 | ALL | 8.20 | 87.100 | Glass | 439950 | S-FPL53 | 39.26 |
|  | S5 | A | 69.85 | −87.100 | Air | | | 39.15 |
|  |  | B | 20.40 | | | | | |
|  |  | C | 0.50 | | | | | |
| 3 | S6 | ALL | 3.16 | 131.160 | Glass | 522598 | S-NSL5 | 28.69 |
|  | S7 | ALL | 40.00 | Flat | Air | | | 27.90 |
| Stop | S8 | ALL | 0.0 | Flat | Air | | | 7.00 |
| Eye Pupil Position | S9 | ALL | 0.0 | — | — | — | — | — |
| Perfect Eye Lens*** | S10 | ALL | 22.50 | — | — | — | — | — |
| Image Plane**** | S11 | ALL | — | Flat | — | — | — | — |

NOTES:
*All material name designations are for Ohara glasses.
**Maximum aperture diameter at object plane, surface S1 is equal to object diameter.
***Surface S10 emulates a perfect eye lens of focal length 22.5 mm which produces no residual optical aberrations including field curvature, hence an image plane that is flat.
****Image plane is flat and equivalent to the retina of a human eye.

Referring now to FIGS. 5A–5E, 6A–6E and 7A–7E, each of these figures comprises a ray aberration graph for the viewfinder eyepiece optical system as shown in FIGS.

4A–4C and set forth in Table 1. Each graph (including the ray aberration graphs of FIGS. 11A–11E, 12A–12E and 13A–13E) includes likes for three (3) wave lengths, namely, 486.1 nm, 546.1 nm and 643.8 nm, as set forth on each sheet. FIGS. 5A–5E are the graphs for the position of the second lens 2 shown in FIG. 4A, FIGS. 6A–6E are the graphs for the position of second lens 2 shown in FIG. 4B, and FIGS. 7A–7E are the graphs for the position of the second lens 2 shown in FIG. 4C. Each of the five ray aberration graphs having the same Figure numeral, for example, FIGS. 5A–5E is for five different positions diagonally across the field of view of the viewfinder eyepiece existing at the exit pupil or eye pupil position S9. Since this optical system is designed for the so-called "letter box" format of 16 by 9 (i.e., 16 units horizontally by 9 units vertically) the diagonal from corner to corner is at about 26.6°. The "A" figure, such as FIG. 5A, of each set of ray aberration graphs is at the corner of the viewable picture, i.e., the furtherest distance from the optical axis, which corner is represented by an angle of 13.3 degrees, as set forth in the center portion of FIG. 5A. The spread of the three graph lines in the "A" Figures represents the lateral color. The numerical value immediately preceding the legend "RELATIVE FIELD HEIGHT", the value "1.00" in FIG. 5A, represents the distance ratio on the diagonal from the center or optical axis O to the corner, which is the actual distance divided by the maximum distance whereby "1.00" equals the maximum distance. Similarly the B, C, D and E Figures represent ray aberration graphs having progressively smaller angles and relative field values. The "B" Figure represents the equivalent of the side of the image, the "C" Figure is at an intermediate distance, the "D" Figure represents the equivalent of the top of the image, and the "E" Figure represents the ray aberration graph on the optical axis O. The ray aberration graphs FIGS. 5A–5E through FIGS. 7A–7E, as well as the ray aberration graphs 11A–11E through 13A–13E described below with respect to the Table 2 embodiment, are produced by the CODE V® optical design software that is commercially available from Optical Research Associates, Inc., Pasadena, Calif., U.S.A., based on the optical design specifications set forth in Tables 1 and 2. It will readily appear to those skilled in the art that these ray aberration graphs establish that there is a very small residual aberration for each of the five locations represented by the A–E Figures for each of the three positions of the movable second lens 2 represented by FIGS. 5A–5E, 6A–6E and 7A–7E, respectively, whereby very high quality images are produced for viewing by the cameraman. Further, it will also readily appear to those skilled in the art that the optical system of the present invention provides good eye relief characteristics, that is, a very large range of acceptable lateral and vertical movement of the human eye relative to the viewfinder without an appreciable loss of image viewing quality. Specifically, by reference to Tables 1 and 2 it will be seen that the eye relief is represented by the "Separation" of 40.00 mm from "Surface" 57 (the right side of lens 3 to the Stop/Eye Pupil Position. This eye relief is substantially greater than most viewfinders.

Figures 10A, 10B:
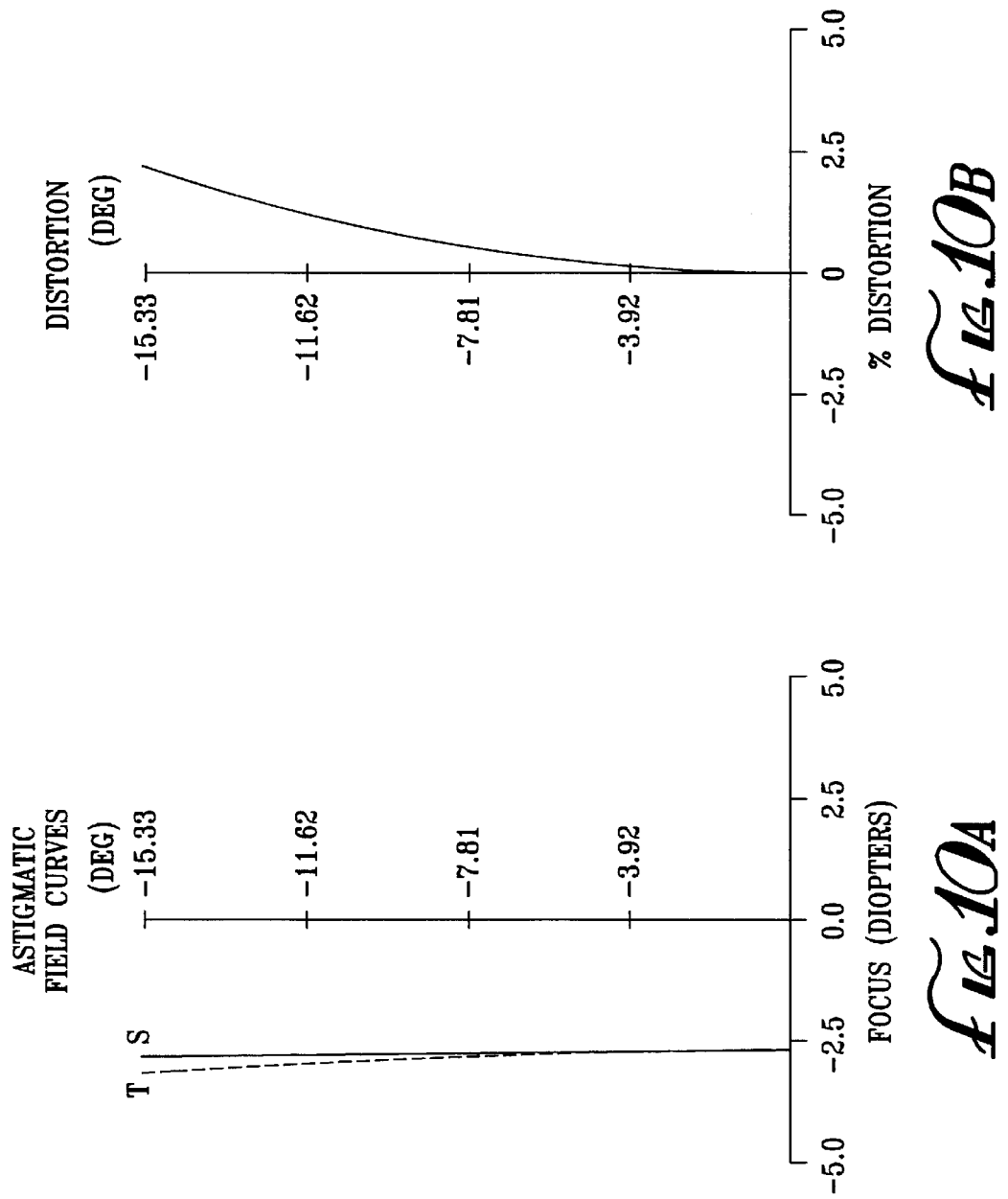
FIGS. 10A and 10B are graphs of the astigmatism and distortion characteristics, respectively, for the viewfinder eyepiece optical system of a preferred embodiment of this invention in the focus adjustment position shown in FIG. 4C.

Referring to FIGS. 8A–8B, 9A–9B, 10A–10B, focus and distortion graphs are illustrated for each of the three positions of the moveable second lens 2 shown in FIGS. 4A, 4B and 4C, respectively. Each "A" Figure, such as FIG. 8A, illustrates the astigmatic field curves with the solid line S representing sagittal and the dashed line T representing tangential. The vertical dimension in each "A" Figure is in degrees from the optical axis with 8.95° at the top representing the maximum spacing from the optical axis. Further, each of the "A" Figures represents the magnitude of focus correction in diopters for that position of the second lens 2, such as the approximately +5.0 diopters correction illustrated in FIG. 8A for a nearsighted person having a −5.0 diopters vision. Similarly, FIG. 9A represents a magnitude of correction of about +0.5 diopters and FIG. 10A represents a magnitude of correction of about −3.0 diopters for farsighted persons. Each of the "B" Figures of FIGS. 8B–10B represents the percent distortion at distances from the optical axis as measured by degrees, with the maximum distance being at the top, as in the "A" FIGS. 8A–10A. While vertical graph lines at each of the selected focus (diopters) values used in the "A" Figures and zero percent distortion in the "B" Figures would represent perfect quality, it will readily appear to those skilled in the art that the magnitude of departure of the graph curves from the ideal vertical lines in FIGS. 8A–10B is relatively small, whereby a very good viewing system results. Again, the graphs forming FIGS. 8A–10B were produced by CODE V® optical design software of Optical Research Associates, Inc., Pasadena, Calif., U.S.A., based on the optical design specifications set forth in Table 1. All of the data in Table 1, as well as Table 2, and all of the graphs and the curves shown in the Figures are given at a temperature of 20° C. (68° F.) and the standard atmospheric pressure (760 mmHg).

Referring now to FIGS. 11A–11E, 12A–12E and 13A–13E, each of these figures comprises a ray aberration graph for the viewfinder eyepiece optical system as shown in FIGS. 4A–4C and as set forth in Table 2. Again, as with FIGS. 5A–5E, 6A–6E and 7A–7E, FIGS. 11A–11E are the graphs for the position of second lens 2 shown in FIG. 4A, FIGS. 12A–12E are the graphs for the position of second lens 2 shown in FIG. 4B, and FIGS. 13A–13E are the graphs for the position of the second lens 2 shown in FIG. 4C. Each of the five ray aberration graphs having the same Figure numeral, for example, FIGS. 11A–11E is for five different positions across the field of view of the viewfinder eyepiece existing at the exit pupil or eye pupil position S9, as with the previously described ray aberration graphs for the optical design of Table 1. A comparison of FIGS. 11A, 12A and 13A with FIGS. 5A, 6A and 7A, respectively, show are smaller spread of the three graph lines, i.e. the lateral color, which illustrates the improved color characteristics of the eyepiece of Table 2.

Referring now to FIGS. 14A, 14B, 15A, 15B, 16A and 16B, focus and distortion graphs are illustrated for each of the three positions of the moveable second lens 2 shown in FIGS. 4A, 4B and 4C. Again, as with FIGS. 8A, 8B, 9A, 9B, 10A and 10B described above, each "A" Figure, such as FIG. 14A, illustrates the astigmatic field curves with the solid line S representing sagittal and the dashed line T representing tangential. The vertical dimension in each "A" Figure is in degrees from the optical axis with 8.95° at the top representing the maximum spacing from the optical axis. Further, each of the "A" Figures represents the magnitude of focus correction in diopters for that position of the second lens 2, such as the approximately +5.0 diopters correction illustrated in FIG. 14A for a nearsighted person having a about −5.0 diopters vision. Similarly, FIGS. 15A and 16A represent corrections of about −0.5 diopters and +3.0 diopters, respectively. Each of the "B" Figures, FIGS. 14B, 15B and 16B, represents the percent distortion at distances from the optical axis as measured by degrees, with the maximum distance being at the top, as in the "A" FIGS. 14A, 15A and 16A. While vertical graph lines at each of the selected focus (diopters) values used in the "A" Figures and zero percent distortion in the "B" Figures would represent perfect quality, it will readily appear to those skilled in the art that the magnitude of departure of the graph curves from the ideal vertical lines in FIGS. 14A–16B is relatively small, whereby a very good viewing system results.

In summary, the preferred embodiments of this invention have been described and shown in specific detail for a complete disclosure of the present invention but it will readily appear to those skilled in the art that numerous variations and modifications of those details may be used without departing from the scope of this invention. For example, the lens elements may be groups of more than one element, may be comprised of different materials and radius of curvature and may include one or more non-spherical lenses such as toroidal, cylindrical, aspheric, toroidal aspheric, rotationally symmetrical, non-rotational symmetrical or the like for accommodating specific characteristics of the system, although accomplishing the same objects, such as a large focus diopter range and clarity, and the physical arrangement may be varied.

The claimed invention is:

1. A viewfinder eyepiece for a camera having a video signal tap for viewing a display device in the viewfinder, comprising:
    a negative powered lens on an optical axis adjacent the display device,
    a first positive powered lens on the optical axis spaced from said negative powered lens and at an eye-viewing end of the eyepiece, and
    a second positive powered lens positioned on the optical axis between said negative powered lens and said first positive powered lens, said second positive powered lens being movable along the optical axis in the space between said negative powered lens and said first positive powered lens for adjusting the focus on the display device through the eyepiece.

2. The viewfinder eyepiece of claim 1, wherein said second positive powered lens is movable a sufficient distance along the optical axis to provide continuous focus adjustment over a range of about eight diopters.

3. The viewfinder eyepiece of claim 2, wherein said adjustment range is from about minus three (−3) diopters correction to about plus five (+5) diopters correction.

4. The viewfinder eyepiece of claim 1, wherein an external sleeve is provided and operatively connected to said second positive powered lens, said sleeve being rotatable for causing movement of said second positively powered lens along said optical axis.

5. The viewfinder eyepiece of claim 1, wherein at least one of the three said lenses is comprised of more than one lens element.

6. The viewfinder of claim 1, wherein each of the three said lenses are made of the same material.

7. The viewfinder of claim 1, wherein the three said lenses are made of at least two different materials.

8. The viewfinder of claim 1, wherein said second positive powered lens is made of a glass that is different from the glass of the other two lenses and reduces lateral color.

9. The viewfinder eyepiece of claim 1, wherein said first positive powered lens is provided with a heating element.

10. A viewfinder eyepiece module for a camera having a video signal tap, comprising:
    a display device mounted in the module and having a display screen facing rearwardly,
    a negative powered lens on an optical axis rearwardly adjacent said display screen,
    a first positive powered lens on the optical axis spaced from said negative powered lens and at an eye-viewing end of the eyepiece module, and,
    a second positive powered lens positioned on the optical axis between said negative powered lens and said first positive powered lens, said second positive powered lens being movable along the optical axis in the space between said negative powered lens and said first positive powered lens for adjusting the focus on the display screen through the eyepiece.

11. The viewfinder eyepiece module of claim 10, wherein said second positive powered lens is movable a sufficient distance along the optical axis to provide continuous focus adjustment over a range of about eight diopters.

12. The viewfinder eyepiece module of claim 11, wherein said adjustment range is from about minus three (−3) diopters correction to about plus five (+5) diopters correction.

13. The viewfinder eyepiece module of claim 10, wherein an external sleeve is provided and operatively connected to said second positive powered lens, said sleeve being rotatable for causing movement of said second positively powered lens along said optical axis.

14. The viewfinder eyepiece module of claim 10, wherein at least one of the three said lenses is comprised of more than one lens element.

15. The viewfinder of claim 10, wherein each of the three said lenses are made of the same material.

16. The viewfinder of claim 10, wherein the three said lenses are made of at least two different materials.

17. The viewfinder of claim 10, wherein said second positive powered lens is made of a glass that is different from the glass of the other two lenses and reduces lateral color.

18. The viewfinder eyepiece module of claim 10, wherein said first positive powered lens is provided with a heating element.

19. A viewfinder eyepiece for viewing a display screen of a display device in the viewfinder of a camera having a video signal tap for supplying a video signal to the display device, comprising:
    first, second and third lenses aligned on an optical axis with said first lens being adjacent the display screen and said third lens being adjacent an eye-viewing location;
    said first, second and third lens combining to provide focusing on the display screen without other lens elements; and
    said second lens being movable along the optical axis in a space between said first lens and said third lens for adjusting the focus on the display screen through the eyepiece;
    wherein said first lens is negatively powered and said second and third lenses are positively powered.

20. The viewfinder eyepiece of claim 19, wherein said second lens is movable a sufficient distance along the optical axis to provide continuous focus adjustment over a range of about eight diopters.

21. The viewfinder eyepiece of claim 20, wherein said adjustment range is from about minus three (−3) diopters correction to about plus five (+5) diopters correction.

22. The viewfinder eyepiece of claim 19, wherein an external sleeve is provided and operatively connected to said second lens, said sleeve being rotatable for causing movement of said second lens along said optical axis.

23. The viewfinder eyepiece of claim 19, wherein at least one of the three said lenses is comprised of more than one lens element.

24. The viewfinder of claim 19, wherein each of the three said lenses are made of the same material.

25. The viewfinder of claim 19, wherein the three said lenses are made of at least two different materials.

26. The viewfinder of claim 19, wherein aid second lens is made of a glass that is different from the glass of said first and third lenses and reduces lateral color.

27. The viewfinder eyepiece of claim 19, wherein said third lens is provided with a heating element.

28. A viewfinder eyepiece optical system for a camera having a video signal tap for viewing a display screen of a display device in the viewfinder, the system comprising:

a first lens 1, and second lens 2 and a third lens 3 having the optical designs set forth in the table below wherein said lenses are identified in the first column as items 1, 2 and 3, respectively; and wherein, the Object Plane item is the location of the display screen of the display device, the Stop item is the location of the optical stop, the Eye Pupil Position item is the location of the exit pupil for viewing the image on the display screen, the Perfect Eye Lens is the location of a surface that emulates a perfect eye lens of focal length 22.5 mm, the Image Plane item is a flat image plane located equivalent to the retina of the viewing human eye, the Surface column identifies the surfaces of the items, the Separation column sets forth the distance from one surface to the next surface, the Radius of Curvature column sets forth the radius of that surface, the Material Type column identifies the material between that surface and the next surface, and the Maximum Aperture Diameter column sets forth the maximum diametric diameter of the light rays passing through the surface:

| Item | Surface | Focus Position | Separation (mm) | Radius of curvature (mm) | Material Type | Maximum Aperture Diameter (mm) |
|---|---|---|---|---|---|---|
| Plane | S1 | ALL | 10.00 | Flat | Air | 42.50 |
| 1 | S2 | ALL | 2.60 | Flat | Glass | 39.92 |
|  | S3 | A | 3.75 | 52.464 | Air | 38.85 |
|  |  | B | 53.20 |  |  |  |
|  |  | C | 73.10 |  |  |  |
| 2 | S4 | ALL | 8.20 | 103.498 | Glass | 39.15 |
|  | S5 | A | 69.85 | −103.498 | Air | 39.03 |
|  |  | B | 20.40 |  |  |  |
|  |  | C | 0.50 |  |  |  |
| 3 | S6 | ALL | 3.16 | 131.160 | Glass | 28.67 |
|  | S7 | ALL | 40.00 | Flat | Air | 27.87 |
| Stop | S8 | ALL | 0.0 | Flat | Air | 7.00 |
| Eye Pupil Position | S9 | ALL | 0.0 | — | — | — |
| Perfect Eye Lens | S10 | ALL | 22.50 | — | — | — |
| Image Plane. | S11 | ALL | — | Flat | — | — |

29. The viewfinder of claim 28, wherein said first lens 1, second lens 2 and third lens 3 are made of the same glass.

30. A viewfinder eyepiece optical system for a camera having a video signal tap for viewing a display screen of a display device in the viewfinder, the system comprising:

a first lens 1, and second lens 2 and a third lens 3 having the optical designs set forth in the table below wherein said lenses are identified in the first column as items 1, 2 and 3, respectively; and wherein, the Object Plane item is the location of a display screen of the display device, the Stop item is the location of the optical stop, the Eye Pupil Position item is the location of the exit pupil for viewing the image on the display screen, the Perfect Eye Lens item is the location of a surface that emulates a perfect eye lens of focal length 22.5 mm, the Image Plane item is a flat image plane located equivalent to the retina of the viewing human eye, the Surface column identifies the surfaces of the items, the Separation column sets forth the distance from one surface to the next surface, the Radius of Curvature column sets forth the radius of that surface, the Material Type column identifies the material between that surface and the next surface, and the Maximum Aperature Diameter column sets forth the maximum diametric diameter of the light rays passing through the surface:

| Item | Surface | Focus Position | Separation (mm) | Radius of curvature (mm) | Material Type | Maximum Aperture Diameter (mm) |
|---|---|---|---|---|---|---|
| Plane | S1 | ALL | 10.00 | Flat | Air | 42.50 |
| 1 | S2 | ALL | 2.60 | Flat | Glass | 39.95 |
|  | S3 | A | 3.75 | 52.464 | Air | 38.89 |
|  |  | B | 53.20 |  |  |  |
|  |  | C | 73.10 |  |  |  |
| 2 | S4 | ALL | 8.20 | 87.100 | Glass | 39.26 |
|  | S5 | A | 69.85 | −87.100 | Air | 39.15 |
|  |  | B | 20.40 |  |  |  |
|  |  | C | 0.50 |  |  |  |
| 3 | S6 | ALL | 3.16 | 131.160 | Glass | 28.69 |
|  | S7 | ALL | 40.00 | Flat | Air | 27.90 |
| Stop | S8 | ALL | 0.0 | Flat | Air | 7.00 |
| Eye Pupil Position | S9 | ALL | 0.0 | — | — | — |
| Perfect Eye Lens | S10 | ALL | 22.50 | — | — | — |
| Image Plane. | S11 | ALL | — | Flat | — | — |

31. The viewfinder of claim 30, wherein said second lens 2 is made of a glass that is different from the glass of said first lens 1 and third lens 3 and reduces lateral color.

* * * * *